(12) United States Patent
Medina et al.

(10) Patent No.: US 10,184,766 B2
(45) Date of Patent: Jan. 22, 2019

(54) METHOD AND DEVICE FOR CONNECTING AND SEPARATING TWO ELEMENTS, WITH COMBINED CONNECTING AND SEPARATING MEANS

(71) Applicant: Airbus Defence and Space SAS, Les Mureaux (FR)

(72) Inventors: Felipe Medina, La Celle-Saint-Cloud (FR); Luc Preaud, Gargenville (FR)

(73) Assignee: AIRBUS DEFENCE AND SPACE SAS, Mureaux (FR)

( * ) Notice: Subject to any disclaimer, the term of this patent is extended or adjusted under 35 U.S.C. 154(b) by 1 day.

(21) Appl. No.: 14/908,705

(22) PCT Filed: Jul. 31, 2014

(86) PCT No.: PCT/EP2014/066503
§ 371 (c)(1),
(2) Date: Jan. 29, 2016

(87) PCT Pub. No.: WO2015/014941
PCT Pub. Date: Feb. 5, 2015

(65) Prior Publication Data
US 2016/0169647 A1    Jun. 16, 2016

(30) Foreign Application Priority Data
Aug. 1, 2013 (FR) ...................... 13 57640

(51) Int. Cl.
*F42B 15/38* (2006.01)
*B64G 1/64* (2006.01)
*F42B 15/36* (2006.01)

(52) U.S. Cl.
CPC ............. *F42B 15/38* (2013.01); *B64G 1/645* (2013.01); *F42B 15/36* (2013.01)

(58) Field of Classification Search
CPC .......... B64G 1/64; B64G 1/641; B64G 1/645; F42B 15/36; F42B 15/38
(Continued)

(56) References Cited

U.S. PATENT DOCUMENTS 3,053,182 A * 9/1962 Christopher .............. B26F 3/04
                                                        102/307
3,233,688 A * 2/1966 Bell ........................ E21B 29/02
                                                        102/307
(Continued)

FOREIGN PATENT DOCUMENTS

EP    0962741    12/1999
EP    1355120    10/2003
(Continued)

OTHER PUBLICATIONS

French Search Report, dated Jul. 1, 2014, priority document.
International Search Report, dated Nov. 5, 2014.

*Primary Examiner* — Stephen Johnson
*Assistant Examiner* — Benjamin S Gomberg
(74) *Attorney, Agent, or Firm* — Greer, Burns & Crain, Ltd.

(57) ABSTRACT

A method and device enable the linear separation of two elements attached to each other through two connecting plates of the first element and the second element respectively. An arrangement connecting and separating the two connecting plates are mixed and comprise a layer. The connecting arrangement comprises soldering, glue, or resin, whereas the separating arrangement comprises thermite. These elements can also be layered rather than mixed. An electrical triggering of this assembly causes its quick and local warming-up and thus enables both of these elements to be separated.

10 Claims, 4 Drawing Sheets

(58) Field of Classification Search
USPC .................... 102/335, 377, 378; 244/131
See application file for complete search history.

(56) References Cited

U.S. PATENT DOCUMENTS

| | | | | |
|---|---|---|---|---|
| 3,362,290 | A * | 1/1968 | Carr | F42B 15/36 102/378 |
| 4,607,780 | A * | 8/1986 | Philipoussi | B23K 1/20 228/118 |
| 5,129,306 | A * | 7/1992 | Fauvel | F42B 15/38 102/378 |
| 5,372,071 | A | 12/1994 | Richards et al. | |
| 5,402,728 | A | 4/1995 | Gamer | |
| 6,125,762 | A * | 10/2000 | Fritz | F42B 15/38 102/378 |
| 6,148,729 | A * | 11/2000 | Smith | F42B 15/38 102/307 |
| 6,250,227 | B1 | 6/2001 | Salort | |
| 6,298,786 | B1 * | 10/2001 | Grosskrueger | B64G 1/641 102/377 |
| 8,082,846 | B2 * | 12/2011 | Cook | F42B 39/14 102/377 |
| 8,607,706 | B2 * | 12/2013 | Kister | B64G 1/645 102/335 |
| 2003/0196544 | A1 | 10/2003 | Comtesse | |
| 2006/0037998 | A1 | 2/2006 | Crabol et al. | |
| 2008/0163748 | A1 | 7/2008 | Facciano et al. | |
| 2012/0110823 | A1 | 5/2012 | Behar | |
| 2014/0331851 | A1 | 11/2014 | Kister et al. | |

FOREIGN PATENT DOCUMENTS

| | | |
|---|---|---|
| EP | 1557358 | 7/2005 |
| FR | 2850454 | 7/2004 |
| FR | 2947808 | 1/2011 |
| WO | 2007094801 | 8/2007 |
| WO | 2011003965 | 1/2011 |
| WO | 2013083898 | 6/2013 |

* cited by examiner

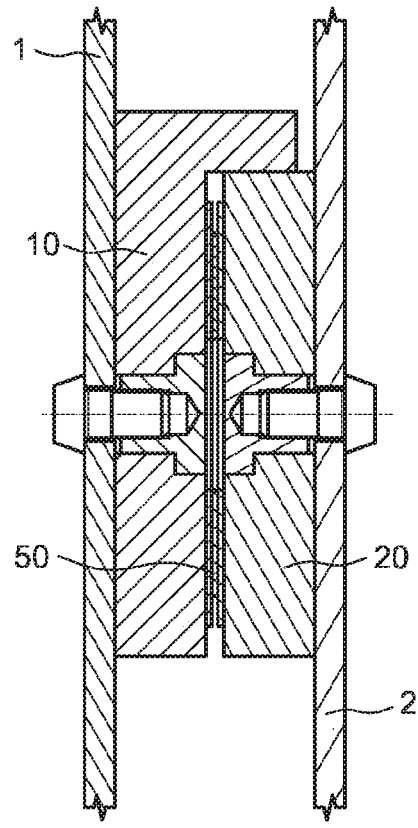
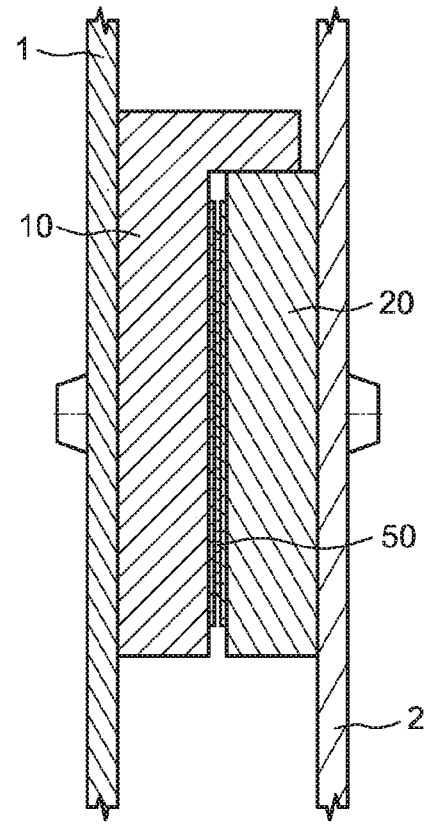
FIG. 6A  FIG. 6B
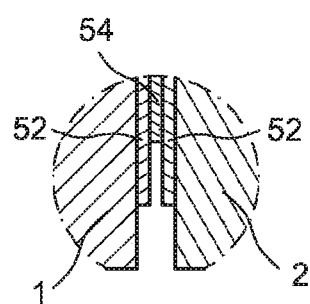
FIG. 7

METHOD AND DEVICE FOR CONNECTING AND SEPARATING TWO ELEMENTS, WITH COMBINED CONNECTING AND SEPARATING MEANS

CROSS-REFERENCES TO RELATED APPLICATIONS

This application claims the benefit of the French patent application No. 1357640 filed on Aug. 1, 2013, the entire disclosures of which are incorporated herein by way of reference.

BACKGROUND OF THE INVENTION

The invention relates to a linear separation, as smooth as possible, of a first element with respect to a second element, which are rigidly connected beforehand. The invention is preferably applicable to spatial launchers, for separating stages from each other or the stage and a payload, of missiles, space probes, or even planes, in the case of a payload release. The purpose of this separation is to reduce the weight of the on-board assembly, or to release a payload. These applications are characterized in that there is a need for separating objects that may be fragile, for example a satellite, and the connection of which has had to undergo high mechanical loads, as those undergone when propelled by a launcher.

FIGS. 1A and 1B illustrate the principle of separation between two elements 1 and 2 of a launcher. The first element 1 is preferably an element with the rank n, preferably a first engine stage. The second element is an element with the rank n+1, either a second engine element, or a payload, for example a satellite. The linear separation, in the launcher axis, thus has to be carried out without deteriorating the base of the second element and, in the case where it is desired to recover the first element 1, without deteriorating the surface thereof, where the connection between both these elements 1 and 2 was located.

In the current state of the art, the connecting/separating system is mostly of four types, which are the following ones:

1) the connections by bolting, riveting and pyrotechnic cutting off by pressure and local temperature rise of the structure. These systems, due to their operation, generate ejected material debris. Moreover, the cutting off causes a significant impact in the structure, which may be damageable for the payloads of the launcher;

Patent document FR 2,947,808 shows an example of implementing such a solution.

2) The connections by bolting, riveting and pyrotechnic cutting off by rupturing the structure, through the deformation of a pyrotechnic element. This solution is the most employed and does not generate debris, but causes a very significant impact;

3) the connections by pyrotechnic bolting and rupturing or separating the nut. This type of solution generates much less impact than the two previous ones, but requires several bolts to transmit strains from one element to the other, thus generating higher failure risks because of the number of devices involved;

4) the connections by straps and rupturing the same by pyrotechnic bolts. This type of solution does not enable high strains to be transmitted between both elements and does not allow for too large of diameters for the launchers. Also in this case, the stress relief causes a high impact in the structures.

Generally, in the current state of these techniques, systems coming from these connecting-separating solutions have the feature of leaving, most of the time, asperities on the external shape of the launcher, after the separation.

The purpose of the invention is to overcome the above-mentioned drawbacks.

SUMMARY OF THE INVENTION

To that end, a first main object of the invention is a method for connecting and separating two elements linearly connected to each other, by a defined local connection, and that have to be securely linearly separated, the separation occurring by a quick warming-up, at or near the connection, the warming-up being remotely triggered.

According to the invention, the method comprises:
connecting both elements at two respective corresponding connecting surfaces of these two elements, by connecting means placed between two respective connecting surfaces of both elements, thermite inflammable by an electrical control connection being placed at the connecting means; and
triggering by an electrical command the thermite to cause, only by its warming-up, the quick warming-up, and not the explosion, and the destruction of the connecting means.

A second main object of the invention is a device for connecting and separating both elements linearly connected to each other by a defined local connection and that have to be securely linearly separated, the separation occurring by a quick warming-up, at or near the connection, the warming-up being remotely triggered.

According to the invention, it comprises:
an assembly placed between two spaced surfaces for connecting the first and second elements respectively and itself comprising, in a mixed manner
means for connecting both elements, that is the first element and the second element; and
thermite; and
means for remotely pyrotechnically triggering the assembly.

The connecting surfaces are preferably those of two connecting plates, of the first element and the second element respectively, these surfaces being mechanically connected to the first element and the second element respectively.

The attachment of the connecting plates to their respective element is made by bolting.

A first implementation of the connecting means is by gluing.

A second implementation of the connecting means is by soldering.

The thermite can be mixed in the connecting means thus forming a mixture.

The thermite can also be placed between two layers of the connecting means.

Another possible implementation of the assembly is a stack of two outer layers made of resin or glue between which a center layer comprising the thermite mixed with resin or glue is provided.

The third main object of the invention is an aeronautic launcher comprising at least one first carrier stage, the wall of which comprises the above-mentioned first element, and at least a linearly carried stage comprising the above-mentioned second element, and a plurality of devices, as described above, distributed on the entire circumference of the launcher, between both stages to secure and linearly separate them.

In such a launcher, it is advantageous that a first of both connecting plates has a land pressing, laterally to the connection, against the second connecting plate.

BRIEF DESCRIPTION OF THE DRAWINGS

The invention and its different characteristics will be better understood upon reading the following description, accompanied with several figures, respectively representing:

FIGS. 6A and 6B, two cross-sections of the device according to the invention, in a second embodiment; and FIG. 7, in cross-section, a detail of this second embodiment of the device according to the invention.

DETAILED DESCRIPTION OF THE PREFERRED EMBODIMENTS

Figure 1A:
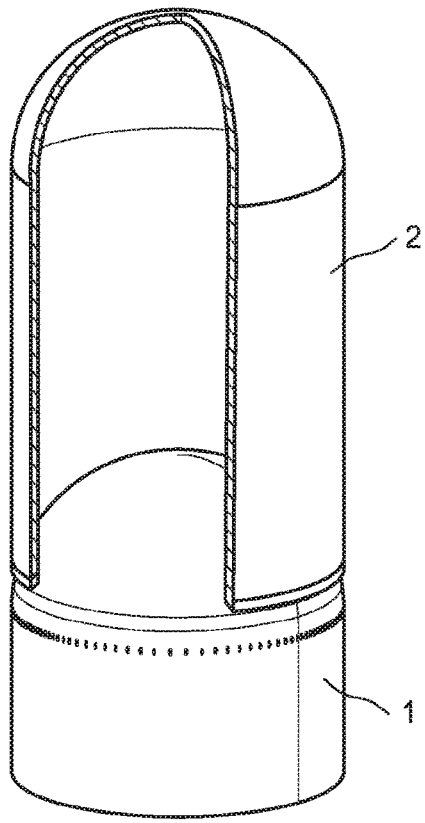
FIGS. 1A and 1B, a scheme representing the separation of two elements of a launcher.
Figure 1B:
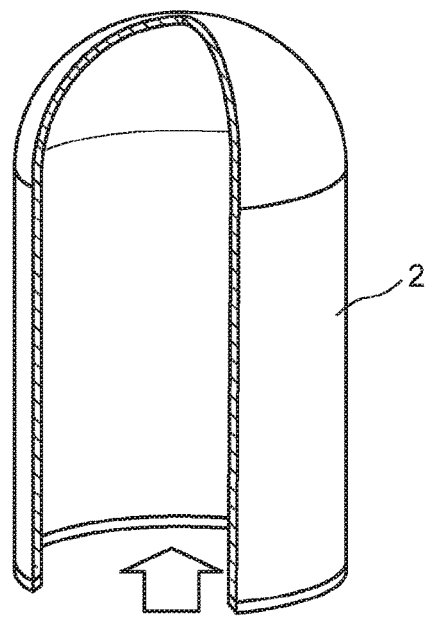
Figure 1B:
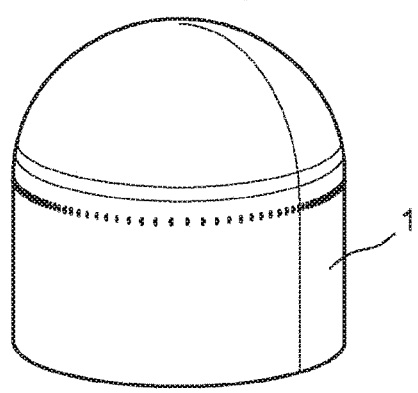
Figure 2:
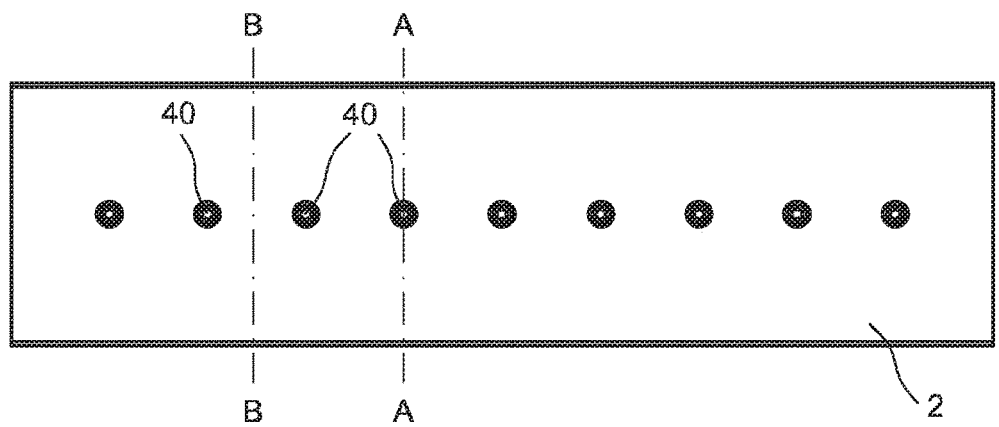
FIG. 2, a side of the device according to the invention.

FIG. 2 enables to better locate, with respect to each other, FIGS. 3A and 3B relating to the first described embodiment of the invention; it will be discussed later.

Figure 3A:
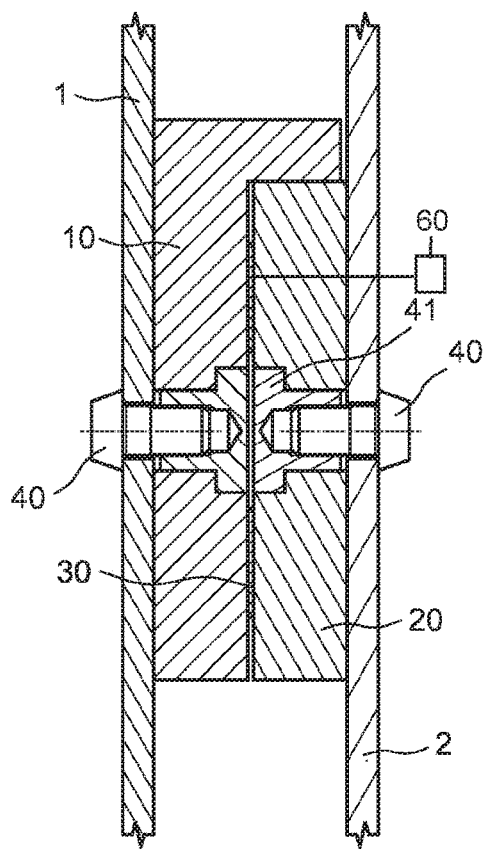
FIGS. 3A and 3B, two different cross-sections of the device according to the invention in a first embodiment.
Figure 3B:
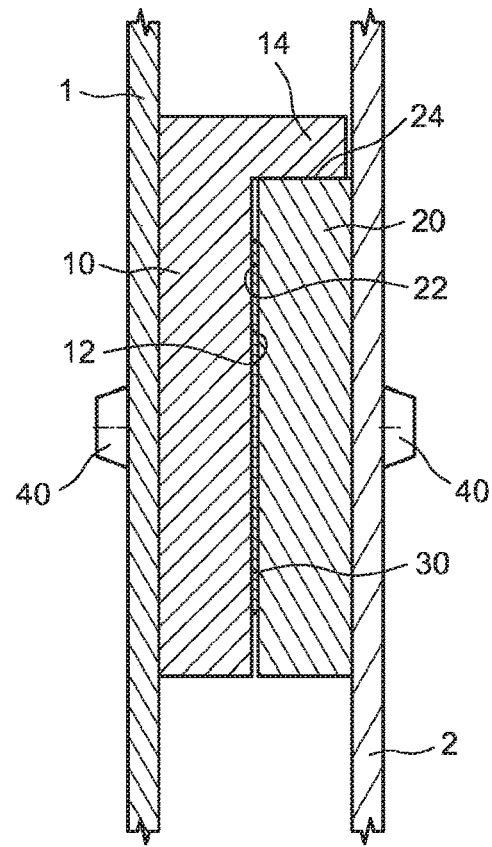

In both FIGS. 3A and 3B, the element 1 and the element 2, which are to be assembled and then separated, are each represented by a plate, which makes up their respective outer structure.

The main connecting elements of both elements 1 and 2 to each other comprises a mixture 30 containing a connecting agent, placed between two connecting plates 10 and 20, more accurately between the respective connecting surfaces 12 or 22 of these two connecting plates 10 and 20, and bolts 40 enabling each of these elements 1 and 2 to be secured with their respective connecting plates 10 and 20.

Lines A-A and B-B of FIG. 2 explain the cross-sections, represented by FIGS. 3A and 3B. Indeed, the line A-A intersects the structure by passing through bolting attachment elements, that is, a screw 40. Thus, along the entire structure to be maintained, assembled, and then separated, are a plurality of attachment elements, such as two screws 40, each screwed through one of both structures 1 or 2, against which the screw head presses. Securing these screws 40 is carried out in nuts 41 incorporated and enclosed in the connecting plates 10 and 20, by virtue of a recess.

It is noted that the connecting plate 10 has a land 14 laterally extending with respect to the direction of the structures of the elements 1 and 2, thus pressing against one end 24 of the other connecting plate 20. Indeed, in the case of an aeronautic, or even spatial, launcher, the tangential forces between the elements 1 and 2 can be very significant. Consequently, to complete the connection function of the connecting element of the mixture 30, the land 14 of the first connecting plate 10 enables most of the longitudinal strains transmitted between both elements 1 and 2 to be uptaken.

The line B-B does not intersect these attachment elements. Thus, FIG. 3B only represents the head of two screws 40 which project from the entire structure.

Figure 4:
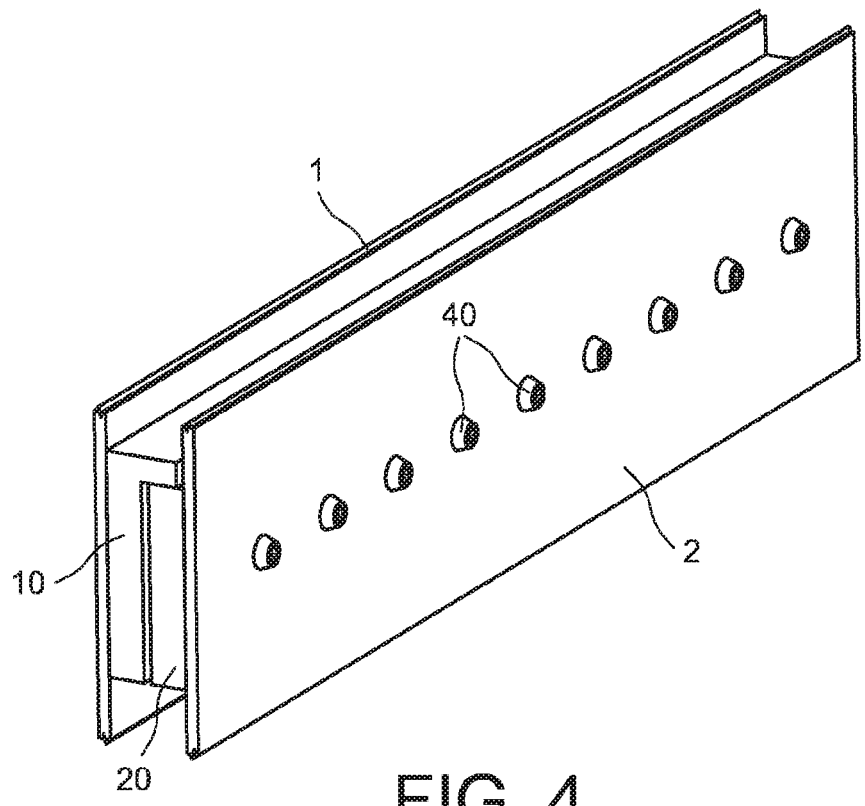
FIG. 4, in isometric view, the device according to the invention in this first embodiment.

FIG. 4 shows the assembly in a perspective view, in particular both elements 1 and 2, both connecting plates 10 and 20 which are relating thereto and heads of the screws 40.

Figure 5:
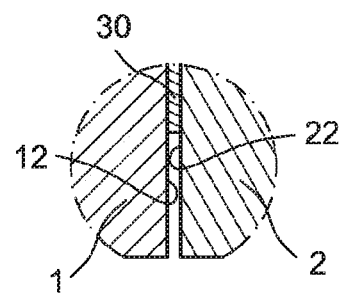
FIG. 5, in cross-section, a detail of the device according to the invention in this first embodiment.

FIG. 5 shows that the mixture 30 is actually sandwiched between the connecting surface 12 of the connecting plate 10 and the connecting surface 22 of the connecting plate 20.

FIGS. 6A and 6B relate to a second embodiment of the invention and correspond to FIGS. 3A and 3B. Thus, it is found the first element 1, the second element 2, their respective connecting plates 10 and 20 and the means for assembling these elements, as screws 40. However, the connection between both connecting plates 10 and 20 is made by a stack 50.

The stack 50 is detailed in FIG. 7. It comprises, in this example, two outer layers 52 made of resin or glue, enclosing or sandwiching a thermite layer 54, mixed with resin or glue.

The elements 1 and 2 are, in the preferential application of the invention, for the first element 1, an aerospace or aeronautic launcher stage with a rank n, on the end of which is attached the second element 2, which is either a second launcher stage with the rank n+1, of the launcher, or an operational load, for example containing equipment or a facility to be put into orbit.

To immobilize both elements 1 and 2, the latter are brought to the melting temperature of the solder or glue used for this assembly. For example, if these structures to be assembled are made of titanium and if the solder chosen is a silver alloy, the entire zone to be assembled is brought to the melting temperature of the silver alloy, which is about 960° C. For this, several conventional methods are chosen, for example induction soldering, oven heating soldering, under a neutral atmosphere, or resistance soldering. For the assembly relative to the present invention, it is noted that induction soldering or resistance soldering are more suitable for high volumes. Once the soldering is carried out, the heating means are removed and the connection is thus operational.

The mixture 30 thus contains heating means, which comprises thermite, preferably sheathed thermite (definition of thermite: mixture of a metal fuel that can often be aluminum, but not only, and of an oxidant, often a metal oxidant). This type of material, by an exothermal oxidoreduction reaction, produces temperatures in the order of 1800° C. It is set out that the connecting means are placed surrounding the entire connection, which is on the periphery of the entire first element 1 and second element 2, preferably an aeronautic launcher.

To carry out the separation of the elements 1 and 2, the mixture 30 placed between both connecting plates 10 and 20 should be triggered. Remote pyrotechnical triggering by an electrical control connection 60, is used.

In the case of two elements of an aerospace launcher, the first element 1 and second element 2 are intentionally placed under pressure. Hence, during the pyrotechnic triggering, they will move away from each other, under the so-called champagne cork effect, along the linear axis of the assembly. In the case where there is no pressure inside both these elements, or between the structures, the distancing can be made by any other known means such as springs, distancing rockets, pneumatic means or the like.

After the first element and the second element are disengaged, the internal structure of the second element has again a surface with neither protuberance, nor pull-out.

Moreover, the invention meets a provision of Article 5 of the Space Operations Act (SOA), relating to the Satellite Lunching Operators, in order to ensure the environment protection of the outer space, in particular for restricting risks related to space debris.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for connecting and separating a first element and a second element, wherein the first element has a first surface and the second element has a second surface, the method comprising the steps:
    attaching a first connecting plate to the first element, such that the first connecting plate has an outer face in direct contact with the first surface of the first element, and the first connecting plate has a first connecting face opposite the outer face of the first connecting plate,
    attaching a second connecting plate to the second element, such that the second connecting plate has an outer face in direct contact with the second surface of the second element, and the second connecting plate has a second connecting face opposite the outer face of the second connecting plate,
    placing the first and second elements such that the first and second surfaces lie in a face-to-face relationship, thereby also placing the first and second connecting faces in a face-to-face relationship,
    establishing a local connection of the first element to the second element by placing a connecting arrangement comprising a thermite and a connecting agent between the face-to-face relationship of the first and second connecting faces, in direct contact with the first and second connecting faces, and
    removing the local connection by electrically triggering the thermite to cause a warming of the thermite, wherein only the warming of the thermite causes a warming-up and a destruction of the connecting arrangement without an explosion, and wherein the second surface of the second element is not mechanically deformed by the destruction of the connecting arrangement.

2. A device for connecting and separating a first element and a second element, wherein the first element has a first surface and the second element has a second surface in a face-to-face relationship with the first surface, the device comprising:
    a first connecting plate attached to the first element, such that the first connecting plate has an outer face in direct contact with the first surface of the first element, and the first connecting plate has a first connecting face opposite the outer face of the first connecting plate,
    a second connecting plate attached to the second element, such that the second connecting plate has an outer face in direct contact with the second surface of the second element, and the second connecting plate has a second connecting face opposite the outer face of the second connecting plate and in a face-to-face relationship with the first connecting face,
    a connecting arrangement comprising a thermite and a connecting agent arranged between the face-to-face relationship of the first and second connecting faces, in direct contact with the first and second connecting faces, such that the connecting arrangement defines a local connection between the first element and the second element, and
    an electrical control arranged to remotely pyrotechnically trigger the thermite in the connecting arrangement to cause a warming of the thermite, wherein only the warming of the thermite causes a warming-up and a destruction of the local connection between the first element and the second element without an explosion, and wherein the second surface is not mechanically deformed during the destruction of the local connection.

3. The device according to claim 2, wherein the first and second connecting plates are mechanically connected to the first element and the second element, respectively.

4. The device according to claim 3, wherein the first and second connecting plates are attached to the first and second elements, respectively, with bolts.

5. The device according to claim 2, wherein one of the first and second connecting plates has a land pressing against the other of the first and second connecting plates.

6. The device according to claim 2, wherein the connecting arrangement comprises a mixture of the thermite and the connecting agent.

7. The device according to claim 2, wherein the connecting arrangement comprises a layer of the thermite placed between two layers of the connecting agent.

8. The device according to claim 2, wherein the connecting agent comprises glue.

9. The device according to claim 2, wherein the connecting agent comprises solder.

10. The device according to claim 2, wherein the connecting arrangement comprises two outer layers made of glue or resin, and a central layer arranged between the two outer layers, wherein the central layer is made up of a mixture of the thermite and the connecting agent, and wherein the connecting agent is a material chosen from the group consisting of resin and glue.

* * * * *